United States Patent [19]

Hill et al.

[11] 3,818,388

[45] June 18, 1974

[54] WAVEGUIDE FREQUENCY MULTIPLIER

[75] Inventors: Kerek Raymond Hill, Sawbridgeworth; Jashwant Singh Dahele, Harlow, both of England

[73] Assignee: International Standard Electric Corporation, New York, N.Y.

[22] Filed: July 9, 1973

[21] Appl. No.: 377,355

[30] Foreign Application Priority Data

Aug. 22, 1972 Great Britain................39084/72

[52] U.S. Cl.......... 333/73 W, 321/69 W, 333/83 R, 333/98 R

[51] Int. Cl....... Holp 1/20, H01p 7/06, H02m 5/20

[58] Field of Search..... 321/69 W; 333/73 W, 83 R, 333/98 R

[56] References Cited

UNITED STATES PATENTS

| | | | |
|---|---|---|---|
| 3,626,327 | 12/1971 | Luchsinger et al. ......... | 333/73 W X |
| 3,631,331 | 12/1971 | Fairley et al. .................... | 321/69 W |

*Primary Examiner*—James W. Lawrence
*Assistant Examiner*—Marvin Nussbaum
*Attorney, Agent, or Firm*—John T. O'Halloran; Menotti J. Lombardi, Jr.; Alfred C. Hill

[57] ABSTRACT

This relates to a waveguide frequency multiplier employing a waveguide having a constant cross-section throughout its length. The waveguide has either (1) a cut-off frequency between the input and output frequencies, in which case the output filter is a conventional dominant mode filter (iris coupled) and the input filter (and each of any intermediate filters) is an evanescent mode filter, or (2) a cut-off frequency above the output frequency in which case the input filter and the output filter (and any intermediate filters) are evanescent mode filters each tuned to the appropriate frequency for that stage of the multiplier.

11 Claims, 4 Drawing Figures

WAVEGUIDE FREQUENCY MULTIPLIER

BACKGROUND OF THE INVENTION

This invention relates to electrical waveguide arrangements, and more particularly to waveguide frequency multipliers.

The operation of a frequency multiplier relies on the properties of a non-linear device, e.g. a varactor diode, which in response to a sinusoid of frequency $f$, referred to as the fundamental frequency, generates higher frequencies which are harmonically related to $f$. A frequency multiplier must therefore have an input filter tuned to the fundamental frequency $f$, and an output filter tuned to the required harmonic of $f$ ($nf$, where $n$ is an integer). Thus, for a frequency doubler, $n = 2$ and the output frequency is then the second harmonic of $f$. The frequency doubler represents the simplest arrangement of a frequency multiplier including an input filter and an output filter and containing between these filters a single varactor diode. A frequency quadrupler may comprise two filters, input and output, with the output filter tuned to $4f$, or there may be two frequency doublers ($f \rightarrow 2f$, $2f \rightarrow 4f$) cascaded together so that there are two varactor diodes, and an intermediate filter acting as the output filter of the first doubler and the input filter of the second doubler. This cascaded arrangement is used where relatively high power is to be transmitted.

Frequency multipliers are widely used in communication systems, and at microwave frequencies (at 1 GHz and above) use of waveguides as the transmission medium has definite advantages, mainly the higher unloaded Q. However, since a propagating waveguide operates in dominant mode only over a limited frequency range (less than one octave), it becomes necessary to use different size waveguides for the input and output filters and any intermediate filter. There are mechanical and electrical disadvantages in such an arrangement.

SUMMARY OF THE INVENTION

An object of the present invention is to provide a waveguide multiplier employing only one size of waveguide for the input and output filters and any intermediate filters that may be required.

A feature of the present invention is the provision of a waveguide frequency multiplier comprising: a waveguide having a constant cross-section throughout its length, the waveguide having a cut-off frequency above an input frequency to the multiplier; an output filter disposed in the waveguide at one end thereof, the output filter being tuned to an output frequency of the multiplier equal to a given harmonic of the input frequency; and an input filter disposed in the waveguide at the other end thereof, the input filter being an evanescent mode filter tuned to the input frequency.

The evanescent mode filter, per se, is fully described in U.S. Pat. No. 3,621,483, and in "Waveguide Bandpass Filters Using Evanescent Modes," G. F. Craven, Electronics Letters, Vol. 2, No. 7, July 1966, pages 25–26. However, the principle of the evanescent mode filter may be briefly stated as in the following paragraph.

As is well known, dominant mode waveguide ceases to propagate progressive waves below its cut-off frequency, and the mode is said to be evanescent. Waveguides in which the dominant mode is evanescent has a positive imaginary (inductive) characteristic impedance ($jZ_o$) to an incident H mode and a real propagation constant ($Y$), and therefore behaves essentially as a pure reactance. If a short section (of length $l$) of this guide is terminated in an obstacle which presents a conjugate (capacitive) reactance at a frequency below the cut-off frequency, the incident power at that frequency will be completely transmitted through the section.

In practice an evanescent mode filter functioning in accordance with the principle indicated in the preceding paragraph will normally comprise two or more sections with each section containing at least one capacitive screw adjusted to the required conjugate match condition. Capacitive screws provide very simply, readily adjustable capacitive obstacles, but it will be understood that other forms of capacitive obstacle may be used.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
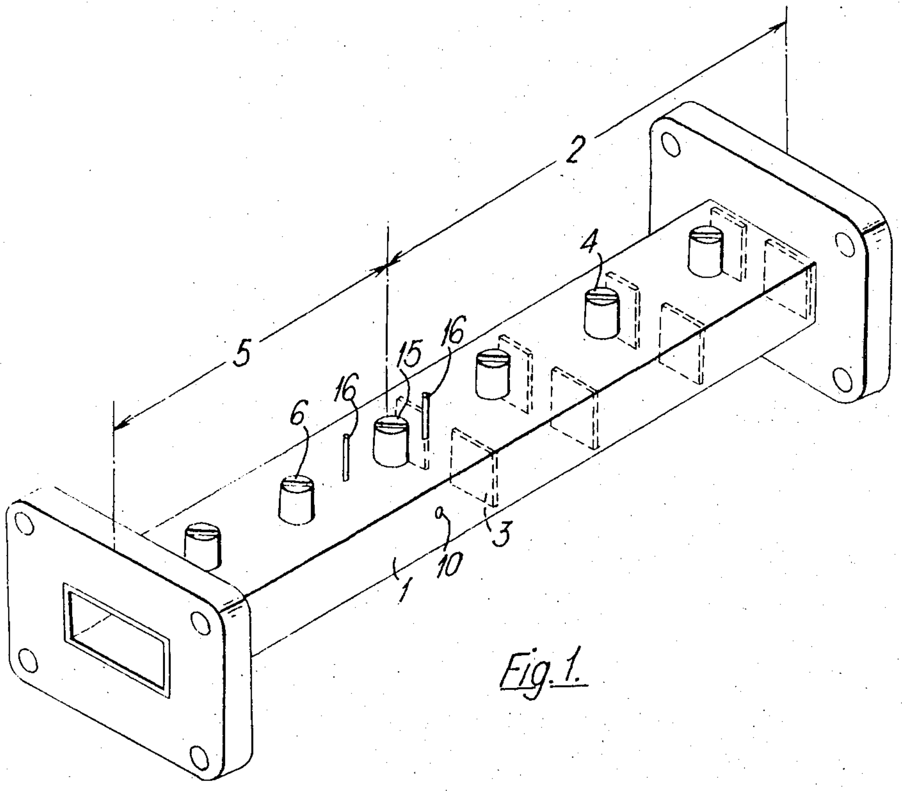
FIG. 1 illustrates a waveguide frequency doubler employing an evanescent mode input filter and a propagating mode output filter in accordance with the principles of the present invention.

The frequency doubler shown in FIG. 1 is constructed in rectangular cross-section copper waveguide (WG 18), which waveguide has the following characteristics:

Inside dimensions (width × height) 1.58 × 0.79 cm (centimeters)

Cut-off frequency 9.486 GHz (gigahertz)

Operating (propagating) frequency range 12.4 – 18.0 GHz., and the frequency doubler has a fundamental input frequency of 7.5 GHz and an output frequency of 15.0 GHz.

Accordingly the single length of one size waveguide 1 which has a constant cross-section throughout the whole of its length has an output filter 2 which is a conventional three-section iris coupled filter comprising four irises 3 and three tuning screws 4, tuned to have a passband centered on the output frequency of 15.0 GHz, at which frequency progressive waves are propagated along the waveguide.

The input frequency of 7.5 GHz is below the cut-off frequency of the waveguide (whose size is determined by the output frequency being propagating), and the input filter is a two-section evanescent mode filter 5 comprising two spaced capacitive screws 6 each extending into the waveguide and adjusted to provide the required conjugate match condition so that the filter is tuned to the input frequency.

Between the input and output filters is a varactor diode 7 (FIG. 2) mounted in the waveguide between an r.f. (radio frequency) contact 8 formed by a preformed mesh or rolled-up ball of a length of gold plated beryllium copper wire within a copper cut 9 supported by a copper crossbar 10, and a diode collett 11 in the central bore of an open circuit radial choke 12 having a layer of dielectric material 13. The diode 7 is self-biased by a resistor 14 across radial choke 12. There is a diode tuning screw 15 for tuning out the capacitance of the diode, and impedance matching screws 16 are provided for accurately matching the diode to each of the input and output filters 2 and 5.

Figure 2:
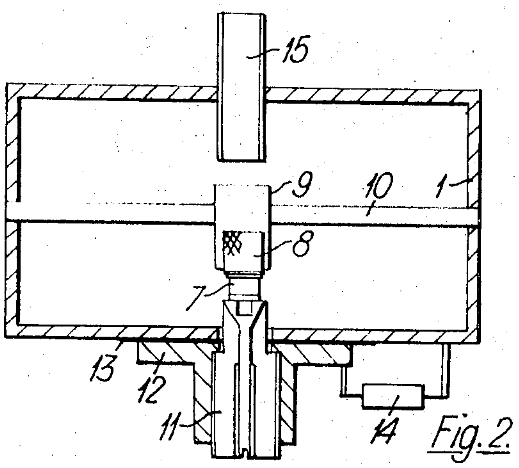
FIG. 2 illustrates details of a varactor diode mounted between the input filter and the output filter of the frequency doubler of FIG. 1.
Figure 3:
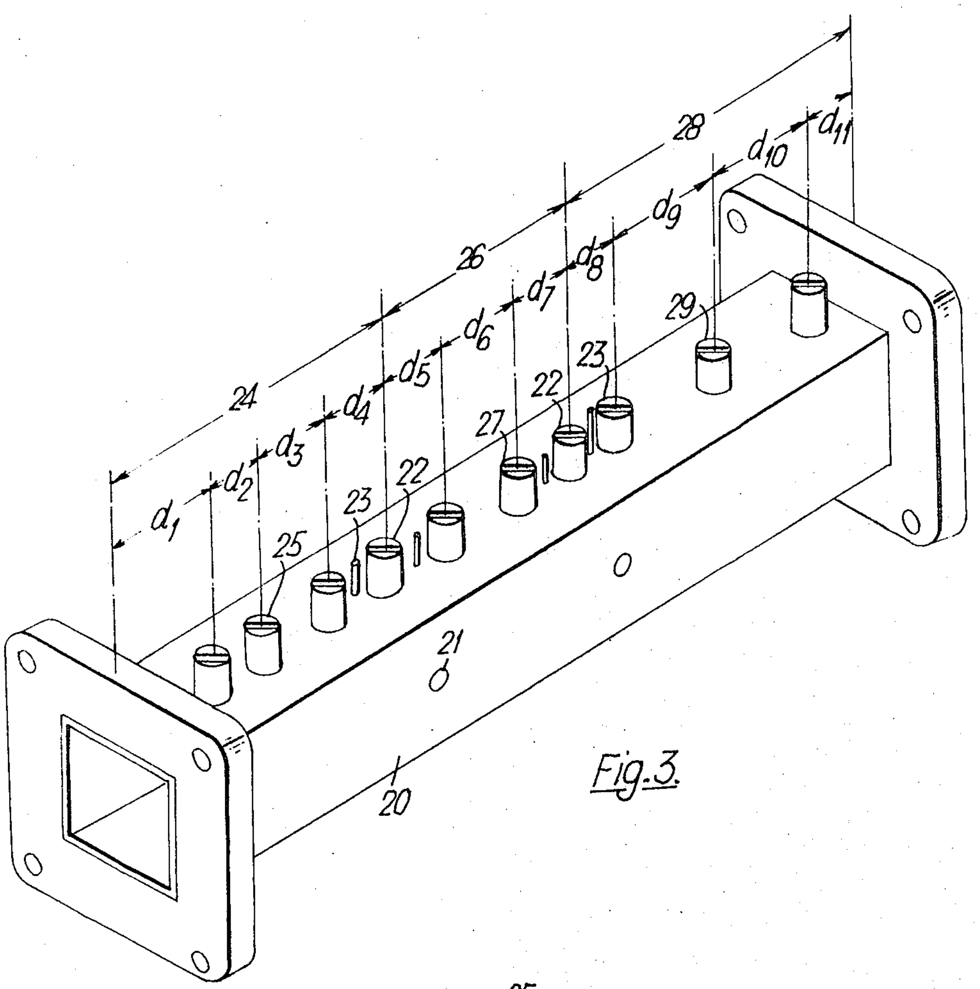
FIG. 3 illustrates a waveguide frequency quadrupler formed from two cascaded frequency doublers and employing evanescent mode filters throughout in accordance with the principles of the present invention.
Figure 4:
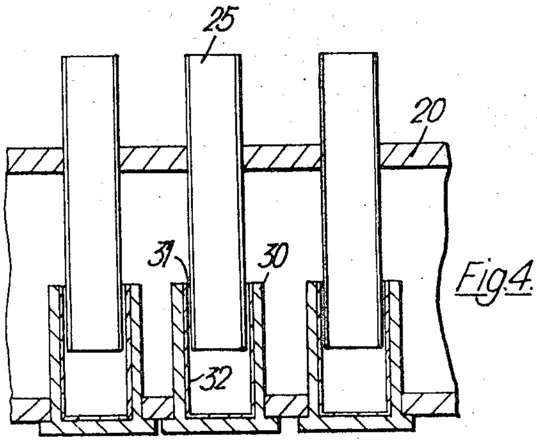
FIG. 4 illustrates details of a coaxial capacitor tuning arrangement usable in the frequency quadrupler of FIG. 3.

The frequency multiplier shown in FIGS. 3 and 4 is constructed in square cross-section copper waveguide which waveguide has the same cut-off frequency and operating (propagating) frequency as that of the rectangular waveguide of the same width used for the frequency doubler of FIGS. 1 and 2, but its internal height and width dimensions are each 1.58 cms.

The multiplier consists of two cascaded frequency doublers with an input frequency of 1.9 GHz and an output frequency of 7.6 GHz, i.e. all frequencies are below the waveguide cut-off frequency. The single length of constant cross-section one size waveguide 20 has an overall length of 14.86 cms and contains two varactor diodes (not shown) each mounted on a cross bar 21 and provided with tuning screws 22 and impedance matching screws 23 in an identical mounting arrangement to that shown in FIG. 2 with each diode being self-biased via radial chokes.

There is a three-section evanescent mode input filter 24 comprising three capacitive screws 25 each adjusted to the conjugate match condition for the filter to have a passband centered on the input frequency of 1.9 GHz, the spacings of the screws 25 being $d_1$ = 2.06 cms., $d_2$ = 0.92 cms., $d_3$ = 1.44 cms., and $d_4$ = 1.18 cms.

There is a two section intermediate state evanescent mode filter 26 comprising two capacitive screws 27 each adjusted to the conjugate match condition for the intermediate stage filter 26 to have a pass band centered on the intermediate stage frequency of 3.8 GHz, the spacings of the screws 27 being $d_5$ = 1.22 cms., $d_6$ = 1.47 cms., and $d_7$ = 1.15 cms.

There is a three-section evanescent mode output filter 28 comprising three capacitive screws 29 each adjusted to the conjugate match condition for the output filter to have a passband centered on the output frequency of 7.6 GHz the spacings of the screws 29 being $d_8$ = 0.99 cms., $d_9$ = 2.01 cms., $d_{10}$ = 2.01 cms., and $d_{11}$ = 0.41 cms.

Square-section waveguide has a higher unloaded Q than the equivalent rectangular waveguide and this compensates for the additional insertion loss arising from the fact that the input filter, particularly, is operating far below the cut-off frequency.

It is impractical to realize the necessary tuning capacitance for the input filter with simple tuning screws, large values of tuning capacitance being required because at the input frequency the waveguide is used far below its cut-off frequency.

As shown in FIG. 4, co-axial capacitors are used, wherein the ends of the tuning screws 25 each extend into copper cups 30 coaxial therewith. Cups 30 are each conductively attached (by soldering) to the wall of the waveguide opposite to that wall through which screws 25 extend. There is a small annular clearance 31, typically of 0.25 mm (millimeter), between each screw 25 and its cup 30. The inner wall of each cup may be lined with a layer 32 of dielectric material to vary (increase) the capacitance and to prevent shorting between screw and cup, since at the highest power level (6 watts input) there is the possibility of voltage breakdown.

It will be understood that other forms of frequency multiplier may be realized in same size constant cross section waveguide, wherein either all the filters (input, output, and any intermediate filters) are designed to operate as evanescent mode filters with the length of waveguide having a cut-off frequency above the output frequency, or the output filter is propagating progressive waves, this output frequency determining the one size of waveguide to be used, and all preceding filters are evanescent mode filters since the waveguide has a cut-off frequency above all earlier stage frequencies.

The evanescent mode medium is non-periodic and this makes for a more gradual impedance transformation along its length, thus making the synthesis of filters, the integration of active devices, and temperature compensation simpler.

Matching of each diode is primarily affected by controlling the distance between the diode and each adjacent filter. Fine adjustment of the matching, e.g. to take up small variations of diode parameters such as may occur from sample to sample, is achieved by the screws (e.g. 16, 23) between the diode and each filter. Such a design results in an integrated multiplier structure with optimumly terminated filters, thus, giving the maximum suppression of unwanted frequencies.

Conventional distributed structures result in multiresonant circuits which can permit the diode to generate a negative resistance giving rise to spurious oscillations. However, evanescent mode integrated structures can be designed to have a monotonic response, thus, inhibiting unwanted negative resistance effects.

Theoretically the only restriction on the operating range of an evanescent mode waveguide is that it should be used below its cut-off frequency. Thus, a given size evanescent mode waveguide can be operated over a frequency range of several octaves, enabling several multipliers to be designed in the same size waveguide. However, there are practical limitations to the size of waveguide that can be employed, these are the reduced unloaded Q of the medium, and the higher tuning capacitance required.

The further below the cut-off frequency the waveguide is operated the smaller the cross-sectional area of the waveguide and, hence, the lower the unloaded Q. This results in increased pass-band insertion loss. In most cases multipliers are not designed to have very narrow bandwidths, for stability reasons. Therefore, in general this increased insertion loss is negligible. In any case the integrated nature of the multiplier tends to compensate for this increased insertion loss.

The major advantages of evanescent mode techniques applied to multipliers over the equivalent dominant mode structures may be summarixed as follows:

a. Reduced volume.

b. Mechanical simplicity (1) One size of waveguide.

(11) Completely integrated structure.

c. Greater designability - optimum harmonic suppression.

d. Greater immunity from spurious oscillations.

e. Simpler temperature compensation.

While we have described above the principles of our invention in connection with specific apparatus it is to be clearly understood that this description is made only by way of example and not as a limitation to the scope of our invention as set forth in the objects thereof and in the accompanying claims.

We claim:

1. A waveguide frequency multiplier comprising:

a waveguide having a constant cross-section throughout its length, said waveguide having a cut-off frequency above an input frequency to said multiplier;

an output filter disposed in said waveguide at one end thereof, said output filter being tuned to an output frequency of said multiplier equal to a given harmonic of said input frequency; and an input filter disposed in said waveguide at the other end thereof, said input filter being an evanescent mode filter tuned to said input frequency.

2. A multiplier according to claim 1, further including a non-linear reactance device disposed in said waveguide between said input and output filters.

3. A multiplier according to claim 1, wherein said waveguide has a cut-off frequency above that of said output frequency; and said output filter includes an evanescent mode filter tuned to said output frequency.

4. A multiplier according to claim 3, wherein said waveguide has a square cross-section.

5. A multiplier according to claim 3, further including at least one intermediate filter disposed in said waveguide between said input and output filters, said intermediate filter being an evanescent mode filter tuned to an appropriate frequency intermediate said input and output frequencies.

6. A multiplier according to claim 5, further including a first non-linear reactance device disposed in said waveguide between said input filter and said intermediate filter; and a second non-linear reactance device disposed in said waveguide between said intermediate filter and said output filter.

7. A multiplier according to claim 1, wherein said waveguide has a cut-off frequency below that of said output frequency and dimensioned such that said output filter is propagating in a dominant mode at said output frequency.

8. A multiplier according to claim 7, wherein said waveguide has a rectangular cross-section.

9. A waveguide frequency multiplier comprising:

a length of waveguide having a constant cross-section throughout its entire length, said length of waveguide including a first portion and a second portion, said length of waveguide having a cut-off frequency above a given input frequency to said multiplier;

a non-linear reactance device disposed in said length of waveguide between said first and second portions, said device being responsive to said input frequency to generate harmonics thereof;

a plurality of capacitive screws spaced along one wall of and extending through said one wall into said first portion between an input end of said first portion and said device so that when said input frequency is applied to said input end said first portion functions as a multiple section evanescent mode filter to transfer energy at said input frequency to said device; and a harmonic frequency selecting filter disposed in said second portion for transferring energy at a selected harmonic frequency through said second portion.

10. A multiplier according to claim 9, further including a plurality of metal cups conductively attached to an inner surface of a wall of said first portion opposite said one wall, each of said cups being disposed to receive a different one of said plurality of screws in a coaxial relationship therewith.

11. A multiplier according to claim 10, further including an inner lining of dielectric material disposed in each of said cups to electrically insulate each of said cups from its associated one of said screws.

* * * * *